US012800027B2

(12) United States Patent
Stewart et al.

(10) Patent No.: US 12,800,027 B2
(45) Date of Patent: Nov. 17, 2026

(54) CONTROLLING GEARS IN A VEHICLE

(71) Applicant: Oxa Autonomy Ltd, Oxford (GB)

(72) Inventors: Alex Stewart, Oxford (GB); Mian Ali, Oxford (GB); Amy Boyd, Oxford (GB); Matthew Austin, Oxford (GB); Andrew Allott, Oxford (GB)

(73) Assignee: Oxa Autonomy Ltd, Oxford (GB)

( * ) Notice: Subject to any disclaimer, the term of this patent is extended or adjusted under 35 U.S.C. 154(b) by 0 days.

(21) Appl. No.: 19/205,830

(22) Filed: May 12, 2025

(65) Prior Publication Data

US 2025/0347342 A1 Nov. 13, 2025

(30) Foreign Application Priority Data

May 13, 2024 (GB) .................................... 2406703

(51) Int. Cl.
*F16H 61/02* (2006.01)
*F16H 61/12* (2010.01)
(Continued)

(52) U.S. Cl.
CPC ......... *F16H 61/12* (2013.01); *F16H 61/0213* (2013.01); *B60W 60/00* (2020.02); (Continued)

(58) Field of Classification Search
CPC ...... B60W 60/00; B60W 20/30; B60W 10/10; F16H 61/12; F16H 61/0213; F16H 59/50; F16H 2061/0087; F16H 2061/1268
See application file for complete search history.

(56) References Cited

U.S. PATENT DOCUMENTS 10,913,460 B2 2/2021 Hammarberg et al.
2005/0079952 A1 * 4/2005 Maxon .................. B60W 30/18 477/107
(Continued)

FOREIGN PATENT DOCUMENTS

CN 203412666 U 1/2014
DE 10312396 A1 * 10/2003 ............. F16H 59/02
(Continued)

OTHER PUBLICATIONS

Extended European Search Report for European Application No. 25170555.4, Search completed Sep. 22, 2025, Mailed Oct. 23, 2025, 6 Pgs.

*Primary Examiner* — Tisha D Lewis
(74) *Attorney, Agent, or Firm* — KPPB LLP

(57) ABSTRACT

Systems and methods for controlling gears in vehicles are described including a method of controlling gears in a vehicle that includes: receiving, by an electrical control unit, ECU, associated with an autonomy stack of the vehicle, a gear selection control signal sent by a gear selection module, GSM, to the gears of the vehicle to select a gear from a plurality of gears; modifying, by the ECU, the gear selection control signal based on a target trajectory of the vehicle generated by the autonomy stack; sending, by the ECU, the modified gear selection control signal to the gears through a controller area network, CAN; then, sending, by the ECU, a power cycling signal to the GSM to turn a power of the GSM off then subsequently turn the power of the GSM back on, after a pre-determining power cycling time.

11 Claims, 4 Drawing Sheets

(51) Int. Cl.
*B60W 60/00* (2020.01)
*F16H 59/50* (2006.01)
*F16H 61/00* (2006.01)

(52) U.S. Cl.
CPC ...... *F16H 59/50* (2013.01); *F16H 2061/0087* (2013.01); *F16H 2061/1268* (2013.01)

(56) References Cited

U.S. PATENT DOCUMENTS

| | | | | |
|---|---|---|---|---|
| 2020/0406915 | A1 | 12/2020 | Yamanouchi et al. | |
| 2022/0075338 | A1 * | 3/2022 | Uthaicharoenpong | G05B 19/042 |
| 2022/0137617 | A1 | 5/2022 | Kim et al. | |

FOREIGN PATENT DOCUMENTS

| | | | |
|---|---|---|---|
| KR | 20220144418 | A | 10/2022 |
| WO | 2022105367 | A1 | 5/2022 |

* cited by examiner

CONTROLLING GEARS IN A VEHICLE

CROSS-REFERENCE TO RELATED APPLICATION

The current application claims priority to GB Patent Application Serial No. 2406703.5 filed May 13, 2024. The disclosure of GB Patent Application Serial No. 2406703.5 is hereby incorporated herein by reference in its entirety.

FIELD

The subject-matter of the present disclosure relates to methods of controlling gears in a vehicle, electrical control units of autonomy stacks, and autonomous vehicles.

BACKGROUND

In an autonomous vehicle, an autonomy stack receives data from sensors, generates a trajectory based on the sensor data, and outputs control commands to various systems of the vehicle in order to execute the trajectory.

It is an aim of the present invention to address such problems and improve on the prior art.

SUMMARY

According to an aspect of the present disclosure, there is provided a method of controlling gears in a vehicle, the method comprising: receiving, by an electrical control unit, ECU, associated with an autonomy stack of the vehicle, a gear selection control signal sent by a gear selection module, GSM, to the gears of the vehicle to select a gear from a plurality of gears; modifying, by the ECU, the gear selection control signal based on a target trajectory of the vehicle generated by the autonomy stack; sending, by the ECU, the modified gear selection control signal to the gears through a controller area network, CAN; then, sending, by the ECU, a power cycling signal to the GSM to turn a power of the GSM off then subsequently turn the power of the GSM back on, after a pre-determining power cycling time. Turning the power of the GSM off and then back on again resets the GSM so that its gear matches the current gear of the vehicle. Therefore, no mismatch will occur after the power cycling time.

In an embodiment, the method further comprises: detecting, by the ECU, an absence of gear selection control signals being sent by the GSM; generating, by the ECU, dummy gear selection control signals in response to detecting the absence of gear selection control signals being sent by the GSM; and sending, by the ECU, the dummy gear selection control signals to the gears through the CAN.

In an embodiment, the generating, by the ECU, dummy gear selection control signals comprises: duplicating, by the ECU, a previous modified gear selection control signal. In this way, other systems of the vehicle requiring the GSM messages can continue to work the GSM is off and is not currently sending messages.

In an embodiment, the previous modified gear selection control signal is a last modified gear selection control signal to be sent to the gears before the absence of gear selection control signals was detected.

In an embodiment, detecting, by the ECU, an absence of gear selection control signals being sent by the GSM includes: monitoring, by the ECU, a time since receipt of a last gear selection control signal to be received; and detecting an absence of the gear selection control signals when the time exceeds a time threshold.

In an embodiment, the pre-determining power cycling time is around 0.1 seconds.

In an embodiment, sending, by the ECU, the dummy gear selection control signals to the gears through the CAN comprises: sending, by the ECU, the dummy gear selection control signals to the gears through the CAN for a dummy message period.

In an embodiment, the dummy message period is between about 0.5 seconds and 1 second.

In an embodiment, the dummy message period is about 0.6 seconds.

According to an aspect of the present disclosure, there is provided an electrical control unit, ECU, of an autonomy stack of a vehicle, comprising: an input configured to receive a gear selection control signal sent by a gear selection module, GSM, to the gears of the vehicle to select a gear from a plurality of gears; a controller configured to modify the gear selection control signal based on a target trajectory of the vehicle generated by the autonomy stack; and an output configured to send the modified gear selection control signal to the gears through a control area network, CAN, wherein the controller is further configured then to generate a power cycling signal to turn a power of the GSM off then subsequently back on, after a predetermined power cycling time, and wherein the output is further configured to send the power cycling signal to the GSM.

According to an aspect of the present disclosure, there is provided an autonomous vehicle comprising: an autonomy stack, wherein the autonomy stack comprises: the electrical control unit, ECU, of the preceding aspect.

BRIEF DESCRIPTION OF DRAWINGS

The subject-matter of the present disclosure is best described with reference to the accompanying figures, in which.

DESCRIPTION OF EMBODIMENTS

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

The embodiments described herein may be embodied as sets of instructions stored as electronic data in one or more storage media. Specifically, the instructions may be provided on a transitory or non-transitory computer-readable media. When executed by the processor, the processor is configured to perform the various methods described in the following embodiments. In this way, the methods may be computer-implemented methods. In particular, the processor and a storage including the instructions may be incorporated into a vehicle. The vehicle may be an autonomous vehicle (AV).

Whilst the following embodiments provide specific illustrative examples, those illustrative examples should not be taken as limiting, and the scope of protection is defined by the claims. Features from specific embodiments may be used in combination with features from other embodiments without extending the subject-matter beyond the content of the present disclosure.

Figure 1:
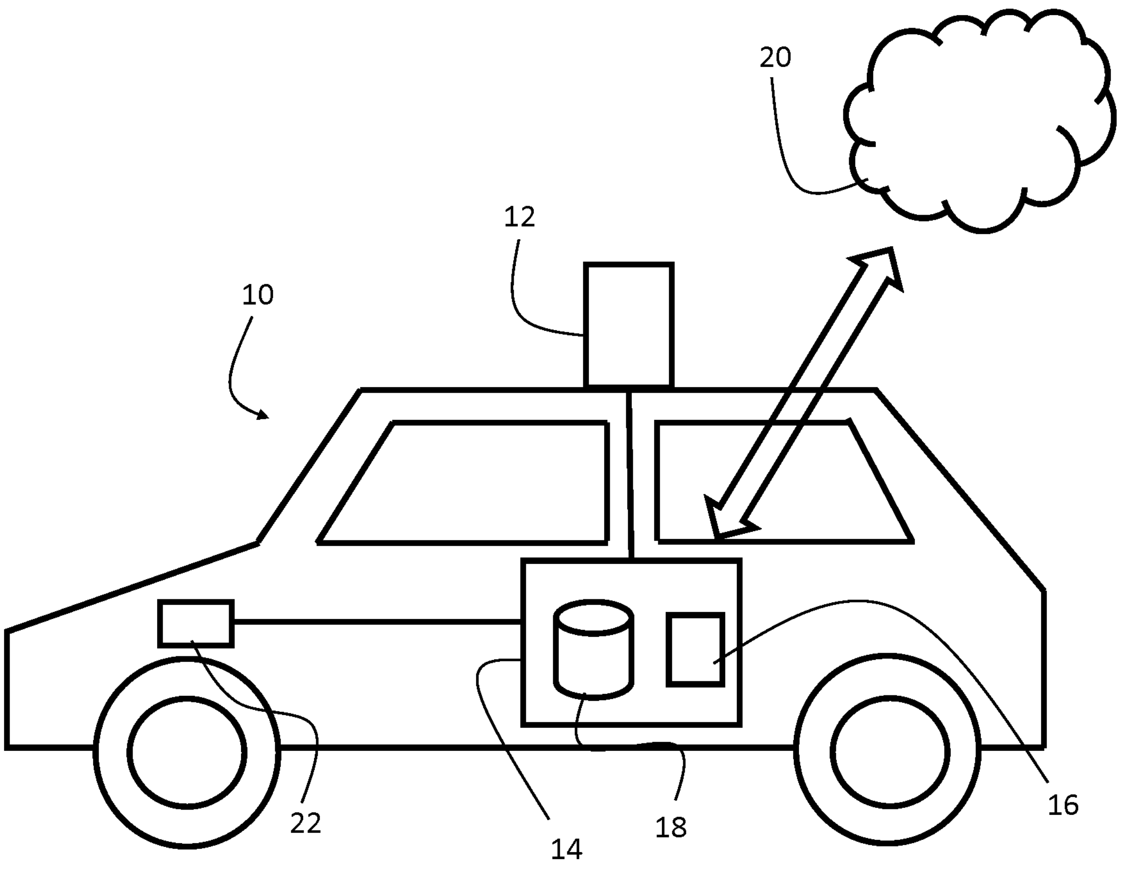
FIG. 1 shows a vehicle, according to at least one embodiment.

With reference to FIG. 1, an AV 10 may include a plurality of sensors 12. The sensors 12 may be mounted on a roof of the AV 10, or integrated into the bumpers, grill, bodywork, etc. The sensors 12 may be communicatively connected to a computer 14. The computer 14 may be onboard the AV 10. The computer 14 may include a processor 16 and a memory 18. The memory may include the non-transitory computer-readable media described above. Alternatively, the non-transitory computer-readable media may be located remotely and may be communicatively linked to the computer 14 via the cloud 20. The instructions may form an autonomy stack. The autonomy stack may include one or more machine learning models trained to generate a trajectory for the AV 10 based on the sensor inputs. The one or more machine learning models may include an end-to-end model and/or may include separate models forming separate perception, planning, and control models. The computer 14 may be communicatively linked to one or more actuators 22 for control thereof to move the AV 10 according to the trajectory. The actuators may include, for example, a motor, a braking system, a power steering system, etc.

The sensors 12 may include various sensor types. Examples of sensor types include LiDAR sensors, RADAR sensors, and cameras. Each sensor type may be referred to as a sensor modality. Each sensor type may record data associated with the sensor modality. For example, the LiDAR sensor may record LiDAR modality data.

The data may capture various scenes that the AV 10 encounters. For example, a scene may be a visible scene around the AV 10 and may include roads, buildings, weather, objects (e.g. other vehicles, pedestrians, animals, etc.), etc.

Figure 2:
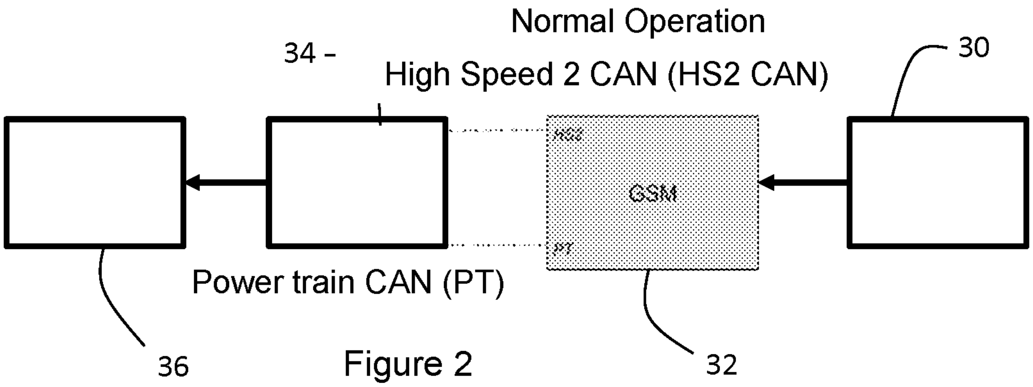
FIG. 2 shows a gear selection module of the vehicle from FIG. 1, for operation in a normal mode, according to at least one embodiment.

With reference to FIG. 2, the AV 10 may be operated in a normal operation mode. In a normal operation mode, the autonomy stack may not be operational in the sense that it does not control the vehicle to move. Instead, control inputs from a driver control movement of a vehicle in a normal, non-autonomous, way.

With reference to FIG. 2, the AV 10 may include a control input 30, a gear selection module (GSM) 32, a controller area network (CAN) 34, and gears 36. There may be other systems than the gears on the vehicle, such as a throttle system, a braking system, a steering system, etc. However, the present disclosure focuses on the gear system.

The control input 30 may be a rotary knob position. The GSM 32 may be configured to select an appropriate gear for the received rotary knob position. The CAN 34 is configured to transfer signals from modules such as the GSM to systems such as the gears. The signal in this case may be a gear selection control signal generated by the GSM 32 to select a particular gear. The frequency of sending these signals may be around 10 Hz. Once the gears receive the gear selection control signal via the CAN 34, the gears 36 selects, or changes to, the appropriate gear accordingly.

Figure 3:
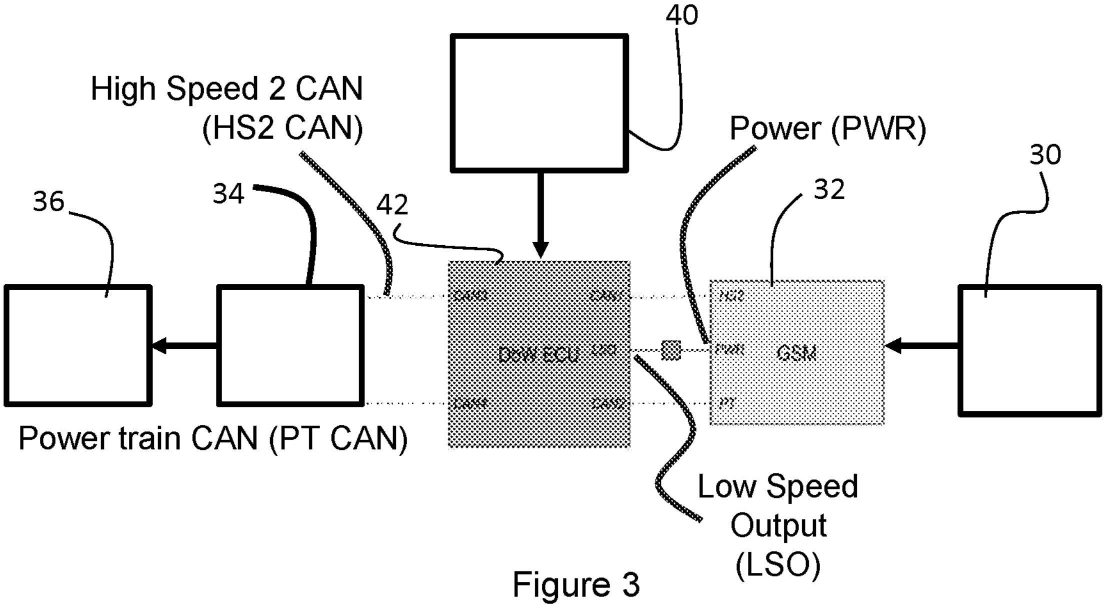
FIG. 3 shows a drive by wire electronic control unit and the gear selection module, for operation in an autonomous mode, according to at least one embodiment.

With reference to FIG. 3, the AV 10 may be operated in an autonomous operation mode. In the autonomous operation mode, the autonomy stack 40 controls movement of the AV 10 as described above. The output from the autonomy stack 40 may be a plurality of control signals for controlling respective systems of the AV 10. One such system is the gears 36. The GSM 32 works in the same way as described above in relation to FIG. 2.

In the autonomous operation mode, a drive by wire (DbW) electronic control unit (ECU) 42 is associated with the autonomy stack 40. More particularly, the DbW ECU, or merely ECU for ease of reference, is communicatively linked to the autonomy stack 40 to receive control signals from the autonomy stack 40. The ECU 42 is positioned between the GSM 32 and the CAN 34. In this way, the ECU has an input configured to receive a gear selection control signal sent by the GSM 32 to the gears 36 to select a gear from a plurality of gears. The ECU 42 may include a controller formed as instructions stored on the storage of the computer 14 (FIG. 1). The controller may be configured to modify the gear selection control signal, from the GSM 32, based on a target trajectory of the vehicle generated by the autonomy stack. The ECU 42 may also include an output configured to send the modified gear selection control signal to the gears through the CAN 34.

The ECU 42 may modify the gear selection control signal by selecting another gear that is more appropriate for achieving the target trajectory than the one selected in the gear selection control signal. For example, when the AV 10 is stationary, the gear selection control signal may select no gear, or neutral. The other gear selected by the ECU may be first gear, for example where the trajectory involves moving the AV 10 off from a stationary position, or park. The ECU 42 may modify the gear selection control signal by replacing the selected gear with the other selected gear, namely the gear selected by the autonomy stack. In this example, no gear, or neutral, is replaced with first gear.

Once the gears 36 receives the modified gear selection control signal, the gears select a gear from a plurality of gears that corresponds to the gear selected in the modified gear selection control signal. In the example above, the first gear is selected.

It will be appreciated that the actual gear that has been selected, and the gear that the GSM believes has been selected will not match. Therefore, a display in the vehicle, e.g. on a gear knob in a centre console of the vehicle, may display a gear that is different to the one actually selected by the gears 36. An issue with this approach may be where the AV 10 is operating in the autonomous operation mode in the manner described above, and then a driver activates an e-stop function to stop autonomous operation mode and transfer to the normal operation mode as described with reference to FIG. 2. When this happens, the mismatch between the vehicle display and the gears may cause a driver to act differently, or cause confusion in the mind of the driver. Additionally, or alternatively, this mismatch may also cause warnings on the vehicle which could distract the driver from their primary task of controlling the vehicle, and managing the situation.

To alleviate this potential issue, the ECU 42, after sending the modified gear selection control signal to the gears 36, may be configured then to generate a power cycling signal to turn a power of the GSM 32 off then subsequently back on, after a pre-determined power cycling time. The pre-determined power cycling time may be 0.1 seconds. The output may also be configured to send the power cycling signal to the GSM.

When the GSM 32 power is turned off, it stops sending messages. Therefore, the gear selection control signal is not sent from the GSM 32 while the power is off. In addition, while the GSM 32 starts up again, in practice, the GSM 32 will not be able to send message for a period of time after the power is turned back on. This may last between 0.5 seconds to 1 second and is usually 0.6 seconds.

Once the power of the GSM 32 is back on, the GSM 32 will match the current gear selected in the gears 36 and so the display on the vehicle will now match the current gear of the vehicle. The GSM 32 reads in the current state of the vehicle via CAN and reflects this state on start up.

The ECU 42 may detect an absence of gear selection control signals being sent by the GSM 32. This may include monitoring, by the ECU 42, a time since receipt of a last gear selection control signal. When the time exceeds a threshold, the absence of the gear selection control signal may be detected.

The ECU 42 may generate dummy gear selection control signals in response to detecting the absence of the gear selection control signals being sent by the GSM. This may be achieved by duplicating, by the ECU 42, a previous modified gear selection control signal. The previously modified gear selection control signal may be the last modified gear selection control signal to be sent to the gears 36 before the absence of gear selection control signals was detected.

The ECU 42 may also be configured to send the dummy gear selection control signals to the gears 36 through the CAN. This may be achieved by the ECU 42 sending the dummy gear selection control signals to the gears 36 through the CAN 34 for a dummy message period. The dummy message period may equate approximately to the period of time the GSM 32 is not sending gear selection control signals after being turned off. For example, the dummy message period may be between about 0.5 seconds and about 1 second. More specifically, the dummy message period may be about 0.6 seconds.

Figure 4:
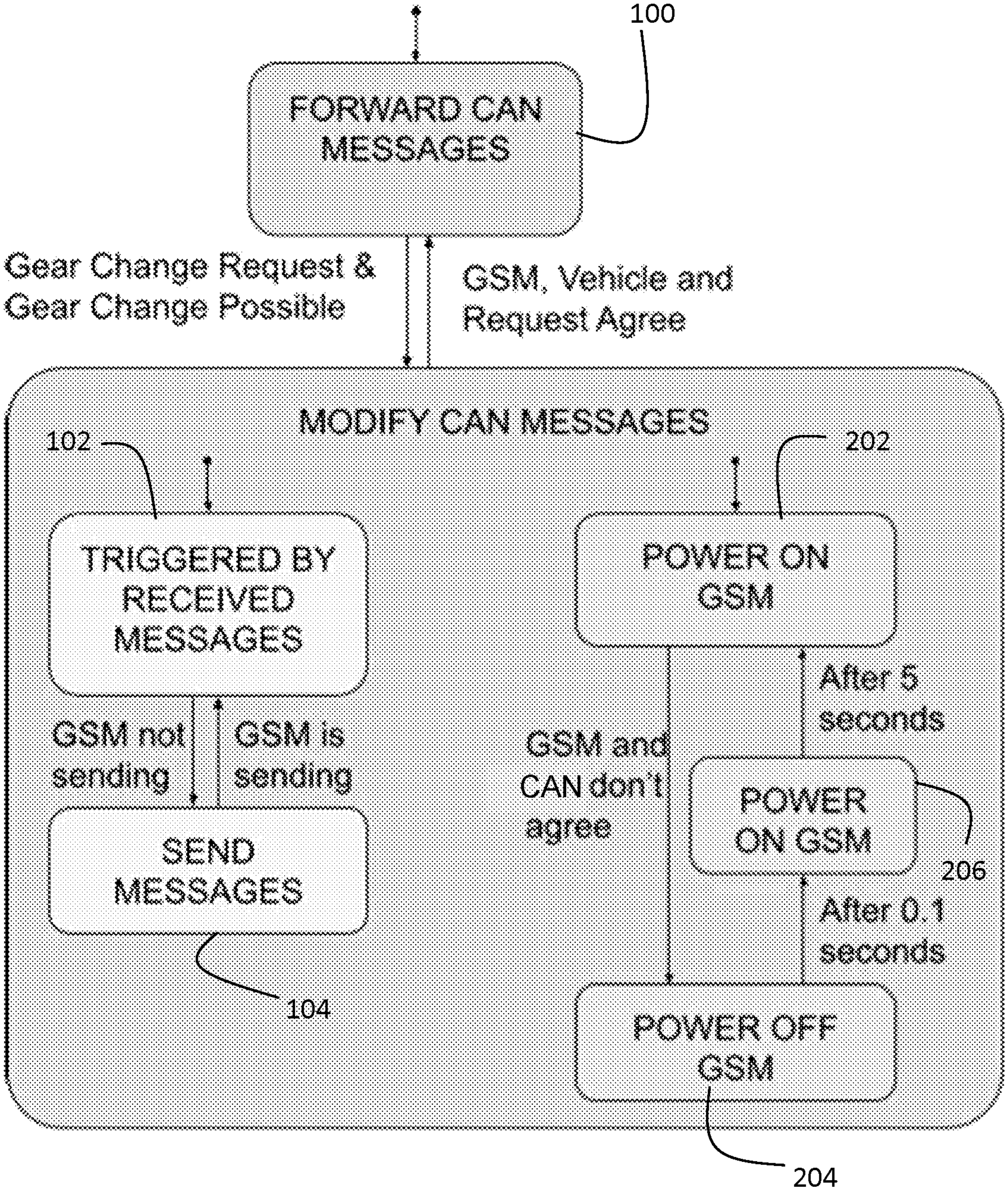
FIG. 4 shows a state chart showing messaging flow from the drive by wire electronic control unit and the gear selection module from FIG. 3, according to at least one embodiment.

With reference to FIG. 4, the dummy messaging process may be described in more detail. For example, when the gear selected by the GSM is appropriate for the trajectory, or when operating in the normal operation mode, the CAN 34 forwards 100 GSM messages.

When operating in autonomous mode and when the GSM gear selection is inappropriate for the trajectory from the autonomy stack, the ECU may modify 102 the gear selection control signal. In FIG. 4 the gear selection control signal is named "CAN messages".

The ECU 42 modifies 102 the messages (gear selection control signals) received from the GSM 32. When the ECU 42 detects that the GSM has stopped sending messages, the ECU 42 sends 104 dummy messages as described above. In addition to what is described above, the ECU will have to increment the counter and recalculate a cyclic redundancy check. The dummy messages may be sent at a rate of around 10 Hz, or another other frequency that matches a rate at which the GSM 32 sends messages. Once the dummy period ends and/or in response to receiving a subsequent message from the GSM 32, the ECU 42 again modifies 102 the messages received from the GSM 32 until the GSM and the base vehicle agree.

The power cycling method may be described as turning a power of the GSM off 204 if there is a mismatch between the current vehicle gear state and the GSM gear. Then, after 0.1 seconds, the power of the GSM 32 is turned on 206 again. After a certain time period, a check 202 is performed to see if the GSM and current gear agree. This process may be repeated if there is a mismatch.

The embodiment(s) described above have been described as apparatus features. The present disclosure also conceives the features as method steps.

Figure 5:
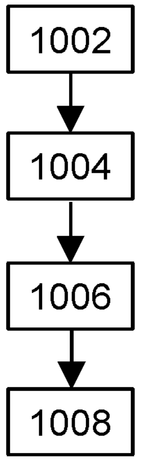
FIG. 5 shows a flow chart summarising a method of controlling gears in a vehicle, according to at least one embodiment.

With reference to FIG. 5, a method of controlling gears in a vehicle may be summarised as comprising: receiving 1002, by an electrical control unit of an autonomy stack, ECU, a gear selection control signal sent by a gear selection module, GSM, to the gears of the vehicle to select a gear from a plurality of gears; modifying 1004, by the ECU, the gear selection control signal based on a target trajectory of the vehicle generated by the autonomy stack; sending 1006, by the ECU, the modified gear selection control signal to the gears through a control area network, CAN; then, sending 1008, by the ECU, a power cycling signal to the gears through the CAN to turn a power of the GSM off then subsequently turn the power of the GSM back on, after a pre-determining power cycling time. The method may be a computer-implemented method.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of controlling gears in a vehicle, the method comprising:

receiving, by an electrical control unit, ECU, associated with an autonomy stack of the vehicle, a gear selection control signal sent by a gear selection module, GSM, to the gears of the vehicle to select a gear from a plurality of gears;

modifying, by the ECU, the gear selection control signal based on a target trajectory of the vehicle generated by the autonomy stack;

sending, by the ECU, the modified gear selection control signal to the gears through a controller area network, CAN;

then, sending, by the ECU, a power cycling signal to the GSM to turn a power of the GSM off then subsequently turn the power of the GSM back on, after a pre-determining power cycling time.

2. The method of claim 1, wherein, further comprising:

detecting, by the ECU, an absence of gear selection control signals being sent by the GSM;

generating, by the ECU, dummy gear selection control signals in response to detecting the absence of gear selection control signals being sent by the GSM; and sending, by the ECU, the dummy gear selection control signals to the gears through the CAN.

3. The method of claim 2, wherein the generating, by the ECU, dummy gear selection control signals comprises:

duplicating, by the ECU, a previous modified gear selection control signal.

4. The method of claim 3, wherein the previous modified gear selection control signal is a last modified gear selection control signal to be sent to the gears before the absence of gear selection control signals was detected.

5. The method of claim 2, wherein detecting, by the ECU, an absence of gear selection control signals being sent by the GSM includes:

monitoring, by the ECU, a time since receipt of a last gear selection control signal to be received; and detecting an absence of the gear selection control signals when the time exceeds a time threshold.

6. The method of claim 1, wherein the pre-determining power cycling time is around 0.1 seconds.

7. The method of claim 2, wherein sending, by the ECU, the dummy gear selection control signals to the gears through the CAN comprises:

sending, by the ECU, the dummy gear selection control signals to the gears through the CAN for a dummy message period.

8. The method of claim 7, wherein the dummy message period is between about 0.5 seconds and 1 second.

9. The method of claim 8, wherein the dummy message period is about 0.6 seconds.

10. An electrical control unit, ECU, of an autonomy stack of a vehicle, comprising:

an input configured to receive a gear selection control signal sent by a gear selection module, GSM, to gears of the vehicle to select a gear from a plurality of gears;

a controller configured to modify the gear selection control signal based on a target trajectory of the vehicle generated by the autonomy stack; and an output configured to send the modified gear selection control signal to the gears through a controller area network, CAN, wherein the controller is further configured then to generate a power cycling signal to turn a power of the GSM off then subsequently back on, after a predetermined power cycling time, and wherein the output is further configured to send the power cycling signal to the GSM.

11. An autonomous vehicle comprising:

an autonomy stack, wherein the autonomy stack comprises:

an electrical control unit, ECU, comprising:

an input configured to receive a gear selection control signal sent by a gear selection module, GSM, to gears of the vehicle to select a gear from a plurality of gears;

a controller configured to modify the gear selection control signal based on a target trajectory of the vehicle generated by the autonomy stack; and an output configured to send the modified gear selection control signal to the gears through a controller area network, CAN, wherein the controller is further configured then to generate a power cycling signal to turn a power of the GSM off then subsequently back on, after a predetermined power cycling time, and wherein the output is further configured to send the power cycling signal to the GSM.

* * * * *